United States Patent [19]

Stapfer

[11] 3,890,276

[45] June 17, 1975

[54] SYNERGISTIC COMBINATIONS OF ORGANIC STABILIZERS FOR HALOGENATED RESINS

[75] Inventor: Christian H. Stapfer, Newtown, Pa.

[73] Assignee: Cincinnati Milacron Chemicals Inc., Reading, Ohio

[22] Filed: Apr. 24, 1973

[21] Appl. No.: 354,130

Related U.S. Application Data

[63] Continuation of Ser. No. 825,048, May 15, 1969, abandoned, which is a continuation-in-part of Ser. Nos. 729,456, May 15, 1968, Pat. No. 3,544,510, and Ser. No. 780,888, Dec. 3, 1968, Pat. No. 3,630,993.

[52] U.S. Cl. .................. 260/45.75 S; 260/45.7 S; 260/45.85 S; 260/45.85 A; 260/45.85 H; 260/45.75 J; 260/45.75 T
[51] Int. Cl.² ......................................... C08F 45/62
[58] Field of Search .......... 260/45.85, 45.75, 45.7 S

[56] References Cited
UNITED STATES PATENTS

| | | | |
|---|---|---|---|
| 2,789,963 | 4/1957 | Hecker | 260/45.75 |
| 3,021,302 | 2/1962 | Frey et al. | 260/45.75 |
| 3,412,139 | 11/1968 | Eggensperger et al. | 260/45.75 |
| 3,413,264 | 11/1968 | Hechenbleikner | 260/45.75 |
| 3,461,091 | 8/1969 | Stamm | 260/45.75 |
| 3,630,993 | 12/1971 | Stapfer | 260/45.75 |
| 3,725,338 | 4/1973 | Weisfeld et al. | 260/45.75 |
| 3,822,233 | 7/1974 | Stapfer | 260/45.75 |

*Primary Examiner*—V. P. Hoke
*Attorney, Agent, or Firm*—Fisher, Christen & Sabol

[57] ABSTRACT

Halogenated resin formulations are stabilized against oxidation and thermal degradation with synergistic combinations of organic divalent sulfur compounds with a mono-hydrocarbyltin compound. The organic, divalent sulfur compounds, which are useful as long term stabilizers for halogenated resins, are synergistically improved by including small amounts of mono-hydrocarbyltin compounds.

17 Claims, No Drawings

SYNERGISTIC COMBINATIONS OF ORGANIC STABILIZERS FOR HALOGENATED RESINS

This application is a continuation of application Ser. No. 825,048, filed May 15, 1969 now abandoned which is a continuation-in-part of application Ser. No. 729,456, filed May 15, 1968, now U.S. Pat. No. 3,544,510 and application Ser. No. 780,888, filed Dec. 3, 1968, now U.S. Pat. No. 3,630,993.

This invention relates to the stabilization of halogenated resin compositions against degradation by oxidation and heat. The invention relates to halogen-containing resins containing an organotin sulfur composition as stabilizer against deterioration by heat and light. More particularly this invention relates to new combinations of certain sulfur-containing organic compounds with organotin compounds and their use in stabilizing halogenated resins.

It is known that halogenated resins and particularly polyvinyl chloride compositions, when exposed to heat and air, undergo rapid degradation, thus causing discoloration of the resin and deterioration of its physical properties. This tendency to decompose is usually reduced significantly by incorporating various metallic and organometallic compounds such as soaps of barium, cadmium, calcium, zinc, lead, organotin mercaptides and carboxylates, etc. into halogenated resin formulation. The metallic stabilizers have many advantages ranging from insuring long term stability of the resin formulation during processing to imparting good clarity and physical properties to the finished product. However, in some cases, metallic compounds, also have at necessary usage levels, disadvantages, such as high cost, toxicity, poor early color.

During recent years a number of organic compounds containing divalent sulfur have been contemplated as stabilizers against the thermal decomposition of halogen containing resins, and in particular polyvinyl chloride. Most of these organic compounds such as sulfides, disulfides, polysulfides, thioacetals, thio anhydrides and β-aminocrotonic acid esters of sulfur bearing diols, exhibit fair long term stabilizing efficacy for both plasticized and rigid formulations but they have never gained commercial importance because substantial discoloration of the polymer occurs during processing. Among the numerous types of compounds proposed for the stabilization of halogen-containing resins, organotin mercaptides and mercapto esters have been found to be particularly efficient and have been commercially used to a steadily increasing extent.

We found that the disadvantages of the prior art can be overcome by including small amounts of a monohydrocarbyl tin compound with organic thio compounds.

Suitable monohydrocarbyl tin compounds are those corresponding to the formula:

$$R\ Sn\ (Z)_n(Z'Y)_{3-2n}$$

wherein R is a hydrocarbyl group containing 1 to 12 carbon atoms, Z and Z' are independently selected from oxygen and sulfur, Y is hydrogen or an organic radical bonded to Z' by a carbon atom and n is a number from 0 to 1½ varying in increments of one-half. R may be an alkyl, such as methyl, butyl, isobutyl, hexyl, octyl, isooctyl and decyl; alkenyl, such as propenyl, butenyl and allyl; cycloalkyl such cyclopentyl; cyclohexyl and 3-methylcyclohexyl; alkylidene, such as propylidene and butylidene, aryl, such as phenyl; alkaryl, such as p-ethylphenyl and aralkyl, such as phenethyl.

The monohydrocarbyl tin compounds suitable for arresting the development of early color in halogen containing resin compositions stabilized with organic thio compounds include stannoic oxides, stannoic sulfides, stannoic acids and thiostannoic acids having one hydrocarbyl group attached to the tin atom. Examples of this group of compounds include methyl stannoic acid, methyl thiostannoic acid, butyl stannoic acid, butyl thiostannoic acid, butyltin sulfide, butyltin oxide, n-octyl stannoic acid, isooctyl stannoic acid and phenyl stannoic acid. These compounds frequently exist in the form of polymers which are condensation products of the above stannoic and thiostannoic acids as well as mixtures of stannoic and thiostannoic acid. The condensation products may contain 2 to 1000 repeat units and generally contain 2 to 100 repeat units corresponding to the formula $(R\ Z_n)_y$ wherein Z is oxygen, sulfur or a mixture of oxygen and sulfur, $n$ equals 1.5 and $y$ denotes the degree of polymerization. Monohydrocarbyl tin compounds suitable for practicing the present invention also include compounds where Y is a hydrocarbon radical, preferably alkyl, having 1 to 12 carbon atoms. Some examples of suitable compounds include the methyl, butyl, n-octyl and isooctyl esters of both monohydrocarbyl stannoic- and thiostannoic acids.

The monohydrocarbyl tin compounds can also have a functional group (Y) attached to Z' by a carbon atom and are useful in practicing the present invention. Functional groups of this type include

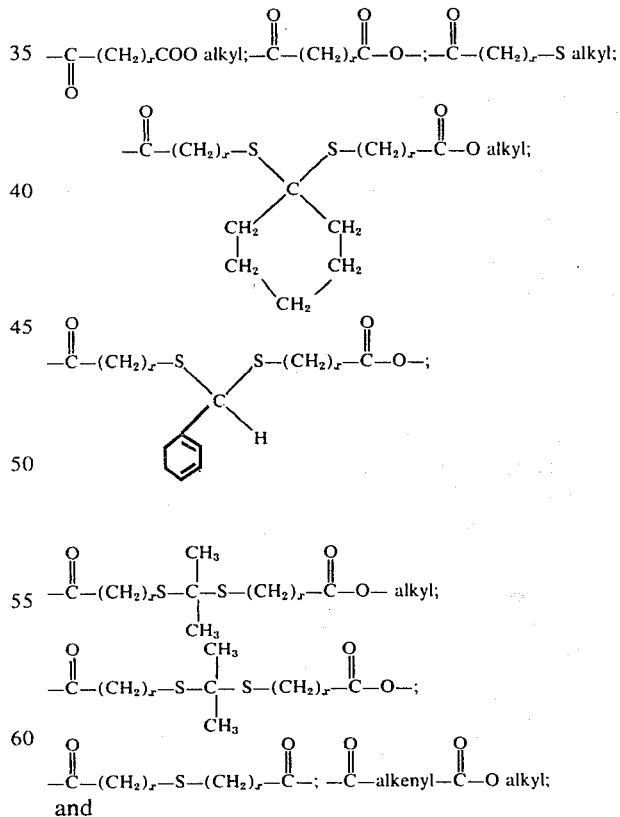

wherein X is 1 to 3. Some examples of monohydrocarbyl tin compounds containing these groups are monobutyltin tris (isooctyl mercaptopropionate); monobutyltin tris (isooctyl-3-mercapto butyrate); di (butylstannoxy) maleate; monobutyltin tris (monoethyl maleate); monobutyltin tris (monoethyl malonate); di (butylstannoxy) malonate and poly [butyl stannoxy (benzol bis mercaptopropionate)]. Some examples of monohydrocarbyl tin compounds having Z and $Z_1$ unlike are bis [monobutyl tin di (isooctyl mercaptopropionate)] oxide and poly [butyl stannoxy cyclohexylidene bis (thio propionate)].

Suitable thio compounds for practicing the present invention include compounds corresponding to general formulae of Table 1 where $R_1$ and $R_2$ are the same or different aryl, alkyl, or alkylene groups which may contain ether, thioether disulfide, carbonyl, amine, ester, thioester or carbon-carbon double bond groups totaling not more than six of any combination thereof; $R_3$ and $R_4$ are the same or different hydrogen, alkyl, alkenyl, alkylidene, aryl, aralkyl, alkaryl or alicyclic; and $r$ varies from 1 to $\infty$.

TABLE 1

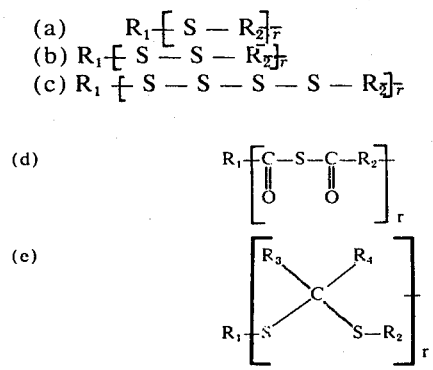

Some examples of such suitable organic thio compounds are: dilauryl sulfide, distearyl thiodipripionate, dithio bis (stearyl propionate), benzoyl disulfide, tetrathio bis (isooctyl acetate), thiolauric anhydride, thiobenzoic anhydride, cyclohexanane bis-dodecyl thioketal, poly (diethylene glycol) ethylidene-bis-mercaptopropionate, poly (3,5-di (-butyl-4-hydroxy benzylidene-bis-mercaptoethanol thiodipropionate), thio diethylene glycol-bis-β-aminocrotonate, as well as, acyl thioketals and thioacetals such as formaldehyde-bis-lauroyl thiocetal, benzaldehyde-bis-benzoylthiocetal and glyoxaltetrakisacetyl thioacetal.

The compounds which may be termed diesters of S,S'-bis (carboxyethyl) mercaptans, can be prepared by condensation of $R_1R_2$ ketones or aldehydes with a beta-mercapto propionic acid ester for example in the presence of an acid catalyst such as hydrochloric or para-toluenesulfonic acid and S,S'-bis (acyloxyethyl) mercaptal diesters can be prepared by condensation of $R_1R_2$ ketones or aldehydes with β-mercaptoethanol followed by esterfication with R acids. They may also be prepared by reacting $R_1R_2$ gem-mercaptans with ethylene oxide followed by esterfication with $R_1$ acids.

The stabilizers of the present invention can be used with halogen containing resins in which halogen is attached directly to the carbon atoms. As such halogenated resins there can be employed chlorinated polyethylene having 14 to 75%, e.g. 27% chlorine by weight, polyvinyl chloride, polyvinylidene chloride, polyvinyl bromide, polyvinyl fluoride, copolymers of vinyl chloride with 1 to 90%, preferably 1 to 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluro-1-chloroethylene, acrylonitrile, chloroacrylonitrile, allylidene diacetate and chloroallylidene diacetate. Typical copolymers include vinyl chloride-vinyl acetate (96 : 4, commercially as VYNW), vinyl chloride-vinyl-acetate (87 : 13), vinyl chloride-vinyl acetate-maleic anhydride (86 : 13 : 1), vinyl chloride-vinylidene chloride (95 : 5), vinyl chloridediethyl fumarate (95 : 5), vinyl chloride-trichloroethylene (95 : 5), vinyl chloride-2-ethylhexyl acrylate (80 : 20). Vinyl chloride copolymers with other ethylenically unsaturated compounds, where the copolymers contain at least 50 percent vinyl chloride units are preferred.

The mixture of stabilizers of the present invention can be incorporated with the resins by admixing in an appropriate mill or mixer, or by another of the well-known methods which provide for uniform distribution throughout the resin compositions. Thus, mixing can be accomplished by milling on rolls at 100° – 160°C.

The monohydrocarbyl tin compounds are generally used in amounts varying from 1 to 25 weight percent of the organic thio compound and preferably in amounts of 4 to 12 weight percent. The synergistic stabilizers of the present invention are generally incorporated into a resin in amount of 0.1 to 10 percent and preferably from 0.5 to 5 weight percent.

The synergistic action of the monohydrocarbyl tin compounds of the present invention is demonstrated to be unexpected in view of the poor results obtained when di-and trialkyl tin compounds are combined with organic thio compounds.

In addition to the novel mixture of stabilizers, there can also be incorporated with the resin conventional additives such as plasticizers, pigments, fillers, dyes, ultra-violet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

In the following examples, the abbreviation pph is utilized to distinguish parts per hundred.

EXAMPLE I

A thioacetal was prepared by polycondensation of thiodiglycol with cyclohexane-1,1-bis (mercaptopropionate), the latter being obtained by a simple mercaptol condensation of cyclohexanone with 3-mercaptopropionic acid. 0.4 parts of the poly (thio diglycol cyclohexane-1,1-bis (mercaptopropionate) containing 5% of butyl stannoic acid dissolved therein, was added to resin formulation which was a mixture of 100 parts of polyvinyl chloride resin (Geon 101-EP) and 0.5 parts of mineral oil as a lubricant. Calculated on the resin, the tin content in this case was only 0.009%.

The blend was milled for 5 minutes at 320°F. and sheeted. Samples cut from the sheets were baked in an air circulating oven 370°F., removed from the oven at 10 minute intervals, rated visually for discoloration.

From 0 to 30 minutes, the above formulation showed excellent early color with no degradation. At 40 minutes, degradation began and the sample turned brown after 50 minutes.

EXAMPLE II

A blend of 100 parts of Diamond Alkali's PVC 40 resin, 2.5 parts of an acrylic processing aid, 0.75 parts of a carboxylic ester was, and 0.5 parts of mineral oil was stabilized with 1.0 part of distearyl cyclohexane-1,1-bis (mercaptopropionate) containing 10% of butyl stannoic acid and extruded on a one inch MPM extruder at 400°F. and 30 RPM. An excellent, clear extrudate was obtained at rate of 9.8 lbs/hour.

EXAMPLE III

Two samples of the same basic formulation used in Example I was stabilized with 1.0 pph of distearyl cyclohexane-1,1-bis (mercaptopropionate) containing respectively 10%, and 5% butyl stannoic acid. One sample was stabilized only with d.c. 1,1 B (MP) and one sample contained no stabilizer as comparative tests. The blends were milled and baked following the procedure of Example I and compared to an unstabilized formulation. The mercaptal alone retarded the initial degradation of the unstabilized sample by 10 minutes and reduced further discoloration. The addition of 5% of butyl stannoic acid added 15 more minutes of good early color whereas the 10% addition further enhanced it by 5 more minutes.

EXAMPLE IV

Five formulations were prepared by milling at 320°F. for 5 minutes, a formulation one hundred parts of Geon 103 EP polyvinyl chloride resin, ten parts of dioctyl phthalate, 0.5 part of mineral oil and a stabilizer of di-butyl (cyclohexane-1,1-bis [mercaptopropionate]) + 10% butyl stannoic acid. The amount of stabilizer in the resin blends was respectively 1.0, 0.5, 0.2, 0.1 and 0.05 pph (0.013 to 0.0065% Sn) baked in an oven at 370°F. A sample of each formulation was removed from the oven at 10 minute intervals in order to determine the influence of the stabilizer level on the stabilizing activity by discoloration. A perfect early color was maintained up to 30 minutes for the blends containing, 1.0, 0.5, 0.2 and 0.1 pph of the stabilizer. The difficulty to evenly distribute the 0.05 pph stabilizer throughout the resin blends caused a poorer performance at that level.

EXAMPLE V

Six formulations were prepared each containing 100 parts GEON (a general purpose polyvinyl chloride resin suspension manufactured by the B. F. Goodrich Company), 0.5 parts of stearic acid and a total of 2 parts of the respective stabilizer indicated in Table II. Each formulation was processed on a two roll mill at 370°F. for five minutes and then divided into a number of 1 inch × ½ inch × 1/6 inch samples, the samples of each formulation were then placed in an air circulatory oven at 370° and a sample of each formulation was removed from the oven at 10 minute intervals over an interval of 1 hour. Formulations 1, 3 and 5 were tested for comparative purposes and do not represent embodiments of the present invention. Table II reports the composition of the stabilizers tested with slight discoloration representing the time for some yellowing of the test sample to occur and moderate discoloration representing the time for an organe or red discoloration to occur.

TABLE II

| No. | Stabilizer Composition in parts of formulation | Very Slight discoloration | Moderate discoloration | Thermal decomposition |
|---|---|---|---|---|
| | | Time in minutes to: | | |
| 1 | a p. thiolauric anhydride | —* | 10 | 20 |
| 2 | 1.9 p. thiolauric anhydride 0.1 p. butylstannoic acid | 20 | — | 30 |
| 3 | 2 p. thiostearic anhydride | —* | 0 | 10 |
| 4 | 1.9 p. thiostearic anhydride 0.1 p. butylstannoic acid | 2- | — | 30 |
| 5 | 2 p. thiobenzoic anhydride | —* | 10 | 20 |
| 6 | 1.9 p. thiobenzoic anhydride 0.1 p. butylstannoic acid | 20 | — | 30 |

*yellowing began during milling

In all three of the formulations not according to the present invention and containing only the thioanhydride, early color developed during the milling operation. The three formulations containing the synergistic combinations of the present invention exhibited no early color and did not show signs of degradation until after 20 minutes of exposure.

EXAMPLE VI

Four resin formulations were prepared, each containing 100 parts of Opalon 630 (a polyvinyl chloride suspension resin manufactured by Monsanto Corporation), 10 parts of dioctylphthalate, 5 parts of epoxidized soy bean oil and 0.2 parts of stearic acid and 2.0 parts of thiolauric anhydride. Three of the formulations contained butyl stannoic acid as a co-stabilizer in the amount indicated in Table III. The largest concentration of butyl stannoic acid corresponds to 7½ weight percent based on the thiolauric anhydride.

Table III reports the results of the above test for the four formulations.

TABLE III

| FORMULATION | AMOUNT OF BUTYL STANNOIC ACID IN pph OF RESIN | TIME IN MINUTES TO SLIGHT DISCOLORATION |
|---|---|---|
| 1 | 0 | —* |
| B | 0.005 | 20 |
| 3 | 0.1 | 30 |
| 4 | 0.15 | 20 |

*Developed slight yellow color during milling.

EXAMPLE VII

Twelve resin formulations, each containing 100 parts of PVC 40 (a general purpose polyvinyl chloride resin manufactured by the Diamond-Shamrock Corporation), 25 parts of dioctyl phthalate, 5 parts of epoxidized soy bean oil, 0.25 parts of stearic acid and 2 parts of the respective stabilizers indicated in Table IV were milled, divided and exposed according to the procedure described in Example 5. The results of the tests are reported in the table with odd numbered formulations included only for comparative purposes and not representing the present invention.

bean oil, 0.25 parts of stearic acid, 1.9 parts thiolauric anhydride and 0.1 part of the co-stabilizer indicated in Table V were processed according to the procedure of Example V. The results of the test are reported in Table V.

TABLE V

| FORMULATION | CO-STABILIZER | FIRST COLOR | SERIOUS DEGRADATION |
|---|---|---|---|
| 1 | butyl stannoic acid | 40 | 90 |
| 2 | dioctyl tin bis (isooctyl thioglycolate) | 10 | 80 |
| 3 | dioctyl tin maleate | 10 | 80 |
| 4 | bis tributyl tin oxide | 0 | 50 |

The test of Example 8 clearly demonstrates that only monohydrocarbyl tin compounds produce the synergistic results obtained by the present invention.

EXAMPLE IX

A blend of 100 parts of PVC 40 (a polyvinyl chloride resin manufactured by Diamond-Shamrock), 2.5 parts

TABLE IV

| FORMULATION NO. | STABILIZER COMPOSITION IN pph OF RESIN | VERY SLIGHT DISCOLORATION | MODERATE DISCOLORATION | SUBSTANTIAL DISCOLORATION |
|---|---|---|---|---|
| 1 | 2 p. thiolauric anhydride | 10 | 20 | 40 |
| 2 | 1.9 p. thiolauric anhydride 0.1 monobutyltin sulfide | 50 | 60 | — |
| 3 | 2 p. benzaldehyde-bis-benzoylthioacetal | 5 | 15 | 30 |
| 4 | 1.0 p. benzaldehyde-bis-benzoylthioacetal 0.1 p. butylstannoic acid | 40 | 50 | — |
| 5 | 2.0 p. dilauryl thiodipropionate | 5 | 10 | 20 |
| 6 | 1.9 p. dilauryl thiodipropionate 0.1 butyltin tris (isooctyl thioglycolate) | 20 | 25 | 40 |
| 7 | 2.0 p. dodecoxyethyl disulfide | 15 | 30 | 45 |
| 8 | 1.9 p. dodecoxyethyl disulfide 0.1 butyltin tris (dodecyl thioglycolate) | 40 | 60 | — |
| 9 | 2.0 p. tetrathio (isooctyl acetate) | 10 | 20 | 25 |
| 10 | 1.9 p. tetrathio (isooctyl acetate) 0.1 p. butylthiostannoic acid | 30 | 40 | 60 |
| 11 | 2.0 p. thiodiethylene glycol-bis β aminocrotonate | 10 | 20 | 40 |
| 12 | 1.9 p. thiodiethylene glycol-bis β aminocrotonate 0.1 butylstannic acid | 50 | 60 | — |

EXAMPLE VIII

Four resin formulations containing 100 parts of PVC 40, 25 parts dioctyl phthalate, 5 parts epoxidized soy of an acrylic processing aid, 0.75 parts of Hoechst Wax E, and a processing lubricant, was stabilized with 1.5 parts of thiodiethylene glycol bis-β aminocrotonate containing 5% butylthiostannoic acid. The blend was extruded at 400°F. at 30 RPM on a one inch MPH extruder. The extrudate was clear, of excellent quality and was obtained at a rate of 9.8 lbs. per hour. The formulation without an organometallic co-stabilizers gave a pale yellow extrudate.

What I claim is:

1. A halogen-containing resin composition comprising a resin selected from the group consisting of chlorinated polyethylene, polyvinyl halides, polyvinylidene chloride and copolymers of vinyl chloride with copolymerizable ethylenically unsaturated monomers stabilized with from 0.1 to 10 weight percent of a synergistic combination of (a) an organic divalent-sulfur compound selected from the group consisting of mercaptals, mercaptols, mercaptans, mercaptocarboxylates and sulfides, said sulfides consisting of carbon, oxygen, hydrogen and sulfur, and (b) a mono-hydrocarbyltin compound corresponding to the formula $$RSn(Z'Y)_{3-2n}$$

wherein R is a hydrocarbyl group containing 1 to 12 carbons, Z and Z' are independently selected from the group consisting of oxygen and sulfur, Y is selected from the group consisting of, when at least one of Z and Z' is sulfur, alkyl having 1 to 12 carbons; $-(CH_2)_x-COO$ alkyl, when $n$ is 0;

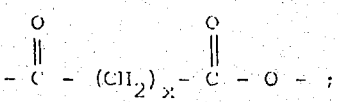

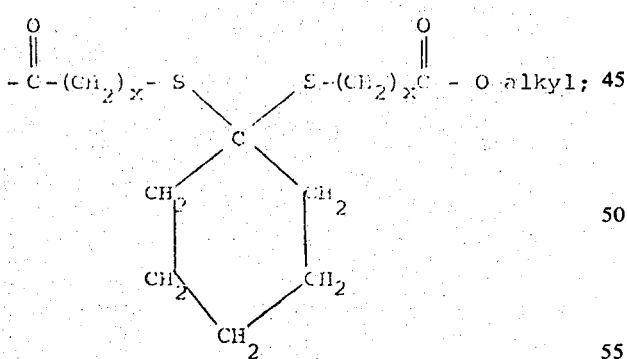

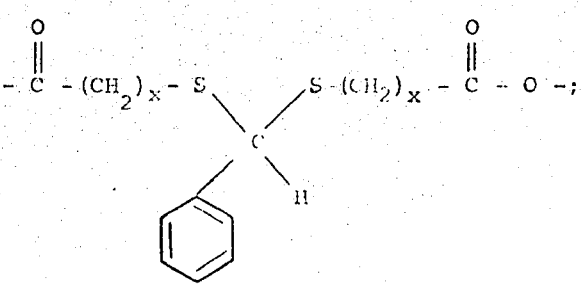

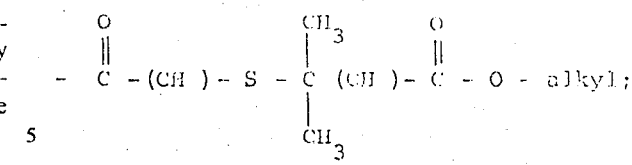

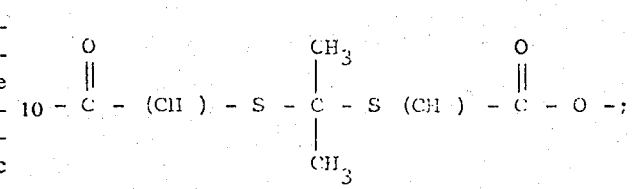

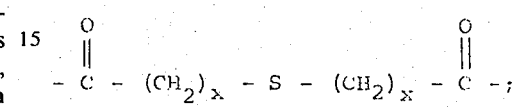

and

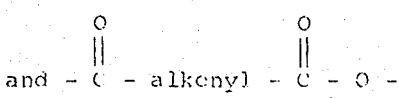

$n$ is a number from 0 to 1½ varying, in increments of ½ and $x$ is 1 to 3, and the amount of (b) present in said combination being about 1 to about 25 weight percent of the weight of (a).

2. The halogen-containing resin composition of claim 1 wherein the halogen-containing resin comprises at least 50 weight percent polyvinyl chloride.

3. The halogen-containing resin composition of claim 1 wherein the halogen-containing resin comprises at least 50 weight percent polyvinyl chloride and about 0.5 to 5 weight percent of the synergistic combination of (a) and (b).

4. The composition of claim 3 wherein (a) is poly [cyclohexylidene-1,1-bis (thiodiglycol mercaptopropionate)] and (b) is about 4 to 12 weight percent butyl stannoic acid based upon (a).

5. The composition of claim 3 wherein (a) is distearyl cyclohexylidene-1,1-bis (mercaptopropionate) and (b) is about 4 to 12 weight percent butyl stannoic acid based on (a).

6. The composition of claim 3 wherein (a) is dibutyl [cyclohexylidene-1,1-bis (mercaptopropionate)] and (b) is about 4 to 12 weight percent butyl stannoic acid based upon (a).

7. The composition of claim 3 wherein (a) is tetrathiobis (isooctyl acetate) and (b) is about 4 to 12 weight percent butylstannoic acid based on (a).

8. The composition of claim 3 wherein R is methyl.

9. The composition of claim 3 wherein (b) is methylstannoic acid.

10. The composition of claim 3 wherein (b) is methylthiostannoic acid.

11. A halogen-containing resin composition comprising a resin selected from the group consisting of chlorinated polyethylene, polyvinyl halides, polyvinylidene chloride and copolymers of vinyl chloride with copolymerizable ethylenically unsaturated monomers stabilized with from 0.1 to 10 weight percent of a synergistic combination of (a) a divalent-sulfur compound selected from the group consisting of dilauryl sulfide, dilauryl thiodipropionate, distearyl thiodipropionate, distearyl cyclohexylidene-1,1-bis (mercaptopropionate, dithio bis (stearyl propionate), dodecoxyethyl disulfide, benzoyl disulfide, tetrathio bis (isooctyl acetate), cyclohexanone bis-dodecyl thioketal, poly [ethylidene-bis (diethylene glycol mercaptopropionate)], poly[3,5-di-t-butyl-4-hydroxy benzylidene-bis (mercaptoethanol thiodipropionate)], poly [cyclohexylidene-1,1-bis (thiodiglycol mercaptopropionate)], formaldehyde-bis-lauroyl thioacetal, benzaldehyde-bis-benzoylthioacetal and glyoxal-tetrakisacetyl thioacetal and (b) a monohydrocarbyl tin compound selected from the group consisting of monohydrocarbyl stannoic acids, monohydrocarbyl thiostannoic acids, mixtures thereof, polymers of said stannoic acids, polymers of said thiostannoic acids, polymers of said mixtures, alkyl esters of said stannoic acids, alkyl esters of said thiostannoic acids and alkyl esters of said mixtures, and the amount of (b) present in said combination being about 1 to about 25 weight percent of the weight of (a).

12. The halogen-containing resin composition of claim 11 wherein the halogen-containing resin is polyvinyl chloride and the monohydrocarbyl tin compound is a monomethyl tin compound.

13. The halogen-containing resin composition of claim 11 wherein the halogen-containing resin is polyvinyl chloride and the monohydrocarbyl tin compound is methyl stannoic acid.

14. The halogen-containing resin composition of claim 11 wherein the halogen-containing resin is polyvinyl chloride and the monohydrocarbyl tin compound is selected from the group consisting of methyl stannoic acid, methyl thiostannoic acid, butyltin sulfide, butyltin oxide, n-octyl stannoic acid, isoctyl thiostannoic acid and the phenyl stannoic acid.

15. A halogen-containing resin composition comprising a resin selected from the group consisting of chlorinated polyethylene, polyvinyl halides, polyvinylidene chloride and copolymers of vinyl chloride with copolymerizable ethylenically unsaturated monomers stabilized with from 0.1 to 10 weight percent of a synergistic combination of (a) a divalent-sulfur compound selected from the group consisting of dilauryl sulfide, dilauryl thiodipropionate, distearyl thiodipropionate, dithio bis (stearyl propionate), benzoyl disulfide, tetrathio bis (isooctyl acetate), cyclohexanone bis-dodecyl thioketal, poly [ethylidene-bis (diethylene glycol mercaptopropionate)], poly [3,5-di-t- butyl-4-hydroxy benzylidene-bis- (mercaptoethanol thiodipropionate)], formaldehyde-bis-lauroyl thioacetal, benzaldehyde-bis-benzoylthioacetal and glyoxal-tetrakisacetyl thioacetal and (b) a monohydrocarbyl tin compound corresponding to the formula $$RSn(Z)_n(Z'Y)_{3-2n}$$

wherein R is a hydrocarbyl group containing 1 to 12 carbon atoms, Z and Z' are independently selected from the group consisting of oxygen and sulfur, Y is selected from the group consisting of —(CH$_2$)$_x$COO alkyl, when $n$ is O;

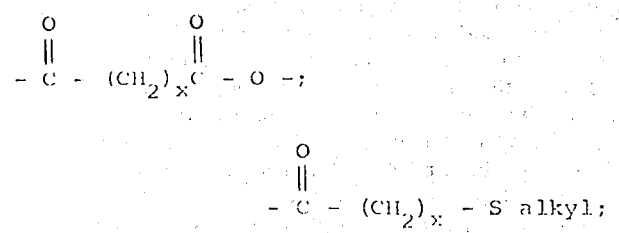

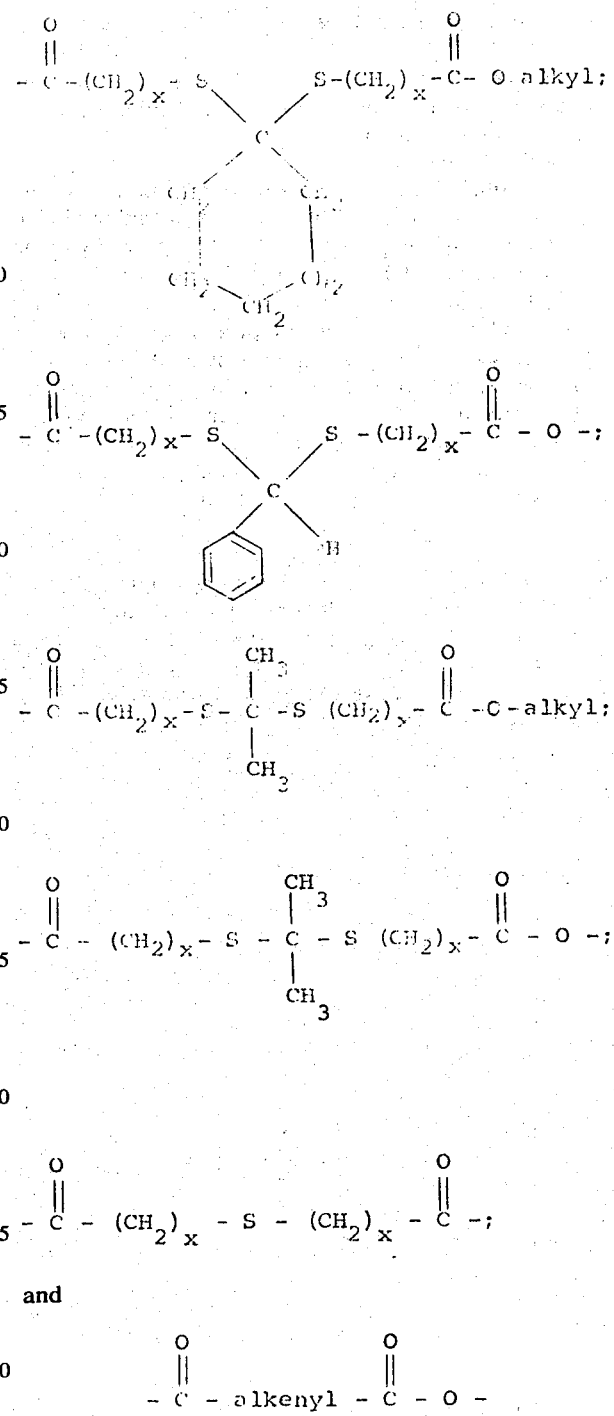

$n$ is selected from the group consisting of 0, ½ and 1 and $x$ is 1 to 3, and the amount of (b) present in said combination being about 1 to about 25 weight percent of the weight of (a).

16. The halogen-containing resin composition of claim 15 wherein the halogen-containing resin is polyvinyl chloride and the monohydrocarbyl tin compound is methylthiostannoic acid.

17. The halogen-containing resin composition of claim 15 wherein the halogen-containing resin is polyvinyl chloride and the monohydrocarbyl tin compound is selected from the group consisting of di(butylstannoxy) maleate, di(butylstannoxy) malonate, poly[butyl stannoxy benzylidene-bis (mercaptopropionate)] and poly [butyl stannoxy cyclohexylidene-bis (thiopropionate)].

* * * * *

UNITED STATES PATENT OFFICE
CERTIFICATE OF CORRECTION

Patent No. 3,890,276          Dated June 17, 1975

Inventor(s) Christian H. Stapfer

It is certified that error appears in the above-identified patent and that said Letters Patent are hereby corrected as shown below:

Col. 9, line 20, "$RSn(Z'Y)_{3-2n}$" should be

--$RSn(Z)_n(Z'Y)_{3-2n}$--.

Signed and Sealed this

Eighteenth Day of March 1980

[SEAL]

Attest:

SIDNEY A. DIAMOND

Attesting Officer      Commissioner of Patents and Trademarks